United States Patent
Senshu

(10) Patent No.: US 6,721,487 B1
(45) Date of Patent: Apr. 13, 2004

(54) MAGNETIC RECORDING METHOD AND APPARATUS FOR DIGITAL SIGNALS, MAGNETIC REPRODUCING METHOD AND APPARATUS FOR DIGITAL SIGNALS AND TAPE-SHAPED RECORDING MEDIUM

(75) Inventor: Yoichiro Senshu, Kanagawa (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 09/401,932

(22) Filed: Sep. 23, 1999

(30) Foreign Application Priority Data

Sep. 25, 1998 (JP) .......................... 10-272135

(51) Int. Cl.[7] .............................................. H04N 5/76
(52) U.S. Cl. .......................... 386/46; 386/124; 360/32
(58) Field of Search .............................. 386/1, 40, 46, 386/67, 124; 360/32, 39, 40, 48; H04N 5/76, 9/79, 5/781

(56) References Cited

U.S. PATENT DOCUMENTS

| | | | | | |
|---|---|---|---|---|---|
| 5,377,050 A | * | 12/1994 | Yun | ........................... | 360/32 |
| 5,410,438 A | * | 4/1995 | Inoue | ......................... | 360/62 |
| 5,585,973 A | * | 12/1996 | Kim | ............................. | 386/67 |
| 6,031,679 A | * | 2/2000 | Higurashi | ............... | 360/73.06 |
| 6,115,531 A | * | 9/2000 | Yanagihara | ................ | 386/67 |
| 6,219,487 B1 | * | 4/2001 | Lee | ............................. | 386/67 |

FOREIGN PATENT DOCUMENTS

| | | |
|---|---|---|
| EP | 0 179 920 | 5/1986 |
| EP | 0 570 202 | 11/1993 |

OTHER PUBLICATIONS

Patent Abstracts of Japan, vol. 3, No. 014, Mar. 29, 1996, JP 07 307958.

* cited by examiner

*Primary Examiner*—Thai Tran
(74) *Attorney, Agent, or Firm*—Frommer Lawrence & Haug LLP; William S. Frommer

(57) ABSTRACT

A recording apparatus for digital signals which effectively utilizes production equipments or components for a magnetic tape to assure long-time recording of high-quality signals on the magnetic tape. In this magnetic recording apparatus for digital signals, two-track data in the DV format is recorded in the same data pattern on a sole track of a magnetic tape 8 mm in width. Extension data are also recorded on this sole track along with the two-track data in the DV format.

12 Claims, 14 Drawing Sheets

MAGNETIC RECORDING METHOD AND APPARATUS FOR DIGITAL SIGNALS, MAGNETIC REPRODUCING METHOD AND APPARATUS FOR DIGITAL SIGNALS AND TAPE-SHAPED RECORDING MEDIUM

BACKGROUND OF THE INVENTION

1. Field of the Invention

This invention relates to a magnetic recording method and apparatus for digital signals, a magnetic reproducing method and apparatus for digital signals for recording or reproducing digital signals for a magnetic tape, and a tape-shaped recording medium having recorded the digital signals.

2. Description of the Related Art

Recently, a camera built-in type digital video tape recorder for household use for recording digital video and audio signals on a magnetic tape, and an installed type digital video tape recorder for household use, are making their debut.

As a recording system for this type of the digital video tape recorder, there is known a format termed a DV system (IEC 61834 helical scan digital video tape cassette recording system using 6.35 mm magnetic tape for consumer (525/60, 624/50, 1125/60 and 1250/50 systems)). In this DV system, the tape width of the video tape in use is 6.35 mm (=¼ inch), which is narrower than the tape width of the video tape used in the conventional analog video tape recorder, such as the 8 mm system: IEC 60843 helical scan video tape cassette system using 8 mm magnetic tape for consumers. Notwithstanding the above mentioned fact, long-time recording with the picture quality higher than that possible with the conventional system is possible in the DV system because the recording signals are compressed and the recording density is increased in the DV system.

Meanwhile, the above-mentioned DV system is not compatible with the conventional analog video tape recorder, such as the 8 mm system. However, if the signals in the DV system can be recorded on a video tape of a wider tape width used in this conventional recording system, it is possible to record signals of higher picture quality for a longer time. On the other hand, if signals of the DV system can be recorded on or reproduced from the video tape used in the conventional recording system, it becomes possible to utilize resources such as production equipments or components of the video tape used in this conventional recording system.

SUMMARY OF THE INVENTION

It is therefore an object of the present invention to provide a method and apparatus for recording digital signals by which the conventional production equipment for magnetic tapes can be effectively utilized to record signals of high picture quality for prolonged time on the magnetic tape to facilitate additional data recording and editing.

It is another object of the present invention to provide a method and apparatus for reproducing signals of high picture quality recorded over a long time on a magnetic tape with the use of the conventional production equipment for magnetic tapes and for assuring facilitated additional data recording or editing.

It is yet another object of the present invention to provide a tape-shaped recording medium on which high quality signals have been recorded and on which data can be recorded additionally or edited easily.

In one aspect, the present invention provides a magnetic recording apparatus including recording data generating means for generating recording data in meeting with a digital recording format applied to a first magnetic tape of a pre-set tape width, extension data generating means for generating extension data for the recording data, and recording means for recording, on a second magnetic tape wider in tape width than the first magnetic tape, the recording data generated by the recording data generating means and the extension data generated by the extension data generating means. The recording means successively records, on a sole track formed on the second magnetic tape, the recording data of at least two tracks in the digital recording format generated by the recording data generating means and the extension data generated by the extension data generating means.

In the present magnetic recording apparatus for digital signals, recording data of at least two tracks in the digital recording format applied to a first magnetic tape and extension data are successively recorded on a sole track formed on a second magnetic tape wider in tape width than the first magnetic tape.

In another aspect, the present invention provides a magnetic recording method including generating recording data in meeting with a digital recording format applied to a first magnetic tape of a pre-set tape width, generating extension data for the recording data, and recording, on a second magnetic tape wider in tape width than the first magnetic tape, the recording data of at least two tracks in the digital recording format and the extension data.

In the present magnetic recording method for digital signals, recording data of at least two tracks in the digital recording format applied to a first magnetic tape and extension data are successively recorded on a sole track formed on a second magnetic tape wider in tape width than the first magnetic tape.

In still another aspect, the present invention provides a magnetic reproducing apparatus for digital signals including reproducing means for reproducing recording data and extension data for the recording data from a second tape having recorded thereon the recording data and the extension data and being wider in tape width than a first magnetic tape, wherein the recording data conforms to a digital recording format applied for the first magnetic tape of a pre-set tape width. The magnetic reproducing apparatus for digital signals also includes recording data processing means for processing the recording data reproduced by the reproducing means, and extension data processing means for processing the extension data generated by the reproducing means. The reproducing means successively reproduces the recording data of at least two tracks in the digital recording format from a sole track formed on the second magnetic tape.

In the present magnetic reproducing apparatus for digital signals, recording data of at least two tracks in the digital recording format applied to a first magnetic tape and extension data are successively recorded on a sole track formed on a second magnetic tape wider in tape width than the first magnetic tape.

In still another aspect, the present invention provides a magnetic reproducing method wherein the recording data of at least two tracks in a digital recording format applied to the a magnetic tape of a pre-set tape width and extension data for the recording data are successively reproduced from a sole track formed on a second magnetic tape, the second magnetic tape having recorded thereon the recording data and the extension data, the second magnetic tape being wider in tape width than the pre-set tape width. The magnetic reproducing method includes processing the reproduced recording data and processing the reproduced extension data.

In the present magnetic reproducing method for digital signals, recording data of at least two tracks in the digital recording format applied to a first magnetic tape and extension data are successively reproduced on a sole track formed on a second magnetic tape wider in tape width than the first magnetic tape.

In yet another aspect, the present invention provides a tape-shaped recording medium having recorded thereon recording data conforming to the digital recording format applied for a first magnetic tape of a pre-set tape width, and extension data, the tape-shaped recording medium being wider in width than the pre-set tape width. At least two tracks in the digital recording format are recorded on a sole recording track.

According to the present invention, the recording data of at least two tracks in the digital recording format applied for the first magnetic tape and the extension data are successively recorded or reproduced on or from a sole track formed on the second magnetic tape wider in tape width than the first magnetic tape, thus assuring recording of data of high data quality on the second magnetic tape for prolonged time, as well as effective utilization of resources, such as conventional production equipments or components. Since the speech signals and video signals can be recorded as extension data, these data can be additionally recorded or edited easily.

DESCRIPTION OF THE PREFERRED EMBODIMENTS

Figure 1:
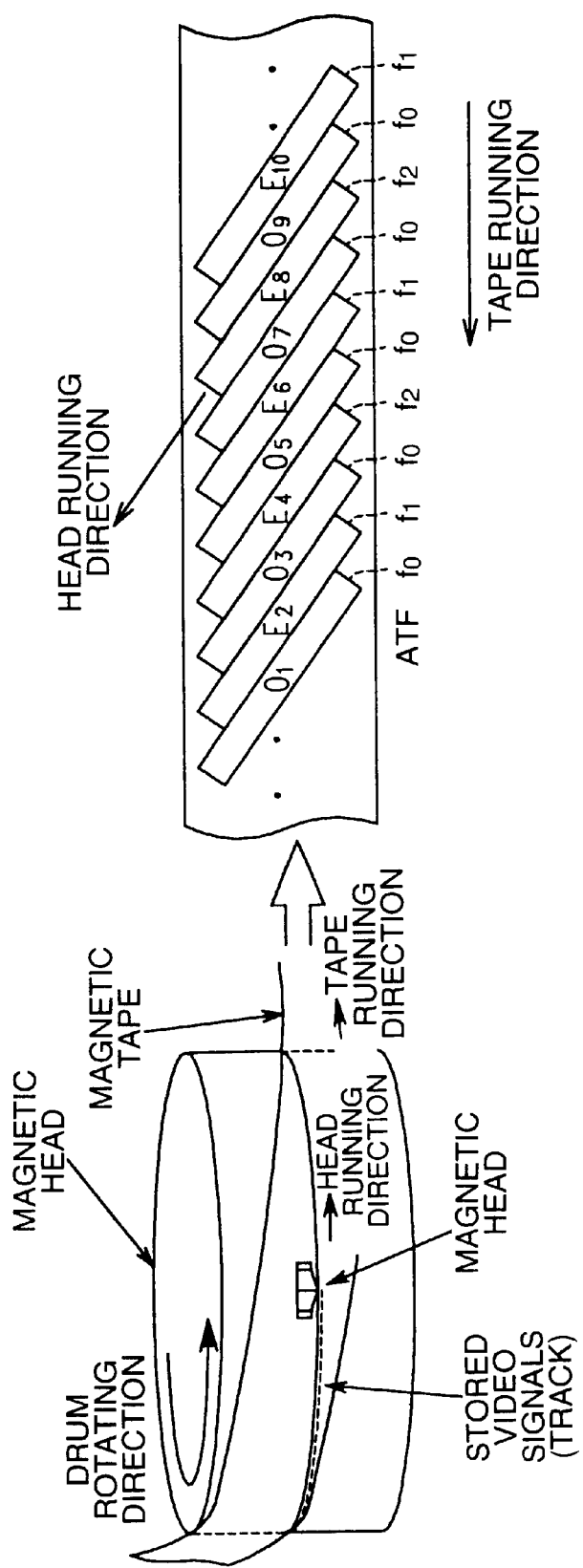
FIG. 1 shows a track pattern with which digital signals of the DV system have been recorded on a magnetic tape of a tape width of 6.35 mm used in the DV system.

Referring to the drawings, the recording system according to the present invention for recording video data and audio data etc on a magnetic tape as a data tape-shaped recording medium is explained. The recording system embodying the present invention is the system of recording digital signals of the so-called DV system on a magnetic tape with a tape width of 8 mm. This system is termed herein the digital 8 mm system. In the following explanation of the recording system, embodying the present invention, comparison is made with the DV system (IEV 61834), which is the conventional recording system, and with the 8 mm system (IEC 60843).

FIG. 1 shows a track pattern which is formed when the DV system digital signals have been recorded on a magnetic tape with a track width of 6.35 mm, used in the DV system. This magnetic tape is herein termed a DV tape.

In the DV system, video signals etc are recorded by a rotary drum on a DV tape having a tape width of 6.35 mm (¼ inch), as shown in FIG. 1. On this rotary drum, two magnetic heads having different azimuth angles are mounted at diagonally opposite positions. Thus, these two magnetic heads scan the DV tape at a pre-set angle relative to the running direction of the DV tape to form a track pattern as shown in FIG. 1. In this DV system, if the tracks recorded by one of the magnetic heads are odd tracks O1, O3, O5, O7 and O9 and those recorded by the other magnetic head are even tracks E2, E4, E6, E8 and E10, video signals conforming to the NTSC system are recorded in an amount corresponding to a frame on the five odd tracks and five even tracks, totalling at ten tracks. In the PAL system, one-frame video signals are recorded on the totality of twelve tracks.

Figure 2:
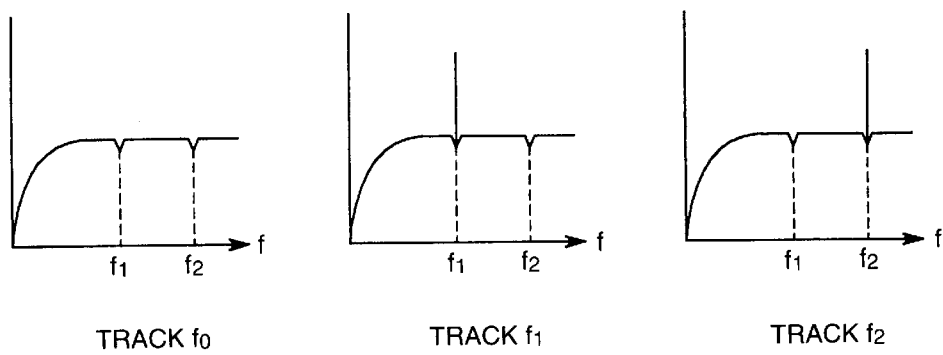
FIG. 2 shows the spectrum of pilot signals superimposed on data of each track.

In the present DV system, the totality of data recorded on the respective tracks are converted in accordance with the 24/25 conversion system. By the 24/25 conversion of the recording signals, pilot signals for ATF (automatic track finding) are superimposed on the entire tracks. The tracking of the magnetic head can be found by detecting the pilot signals at the time of reproduction. In the 24/25 conversion, extra one bit is inserted into data every 24th bit to superimpose three low frequency range pilot components into a data string of the recording data. Specifically, the run length of the recording data is set to 9 or less and pilot signals, and the frequencies of f0, f1 and f2, which will satisfy the spectrum shown in FIG. 2, are superimposed on the respective tracks. In the present DV system, pilot signals with the frequency f0 are superimposed on the odd tracks O1, O3, O5, O7 and O9, whilst pilot signals with the frequencies f1 and f2 are alternately superimposed on the even tracks E2, E4, E6, E8 and E10. Thus, on the whole, the pilot signals of the frequencies repeated in the sequence of ... f0, f1, f0, f2, f1, f0, f2, ... are recorded on the respective tracks. By recording these pilot signals, the pilot components with the frequencies f1, f2 can be obtained from the neighboring tracks as crosstalk signals, so that stable tracking can be applied during reproduction.

Figure 3:
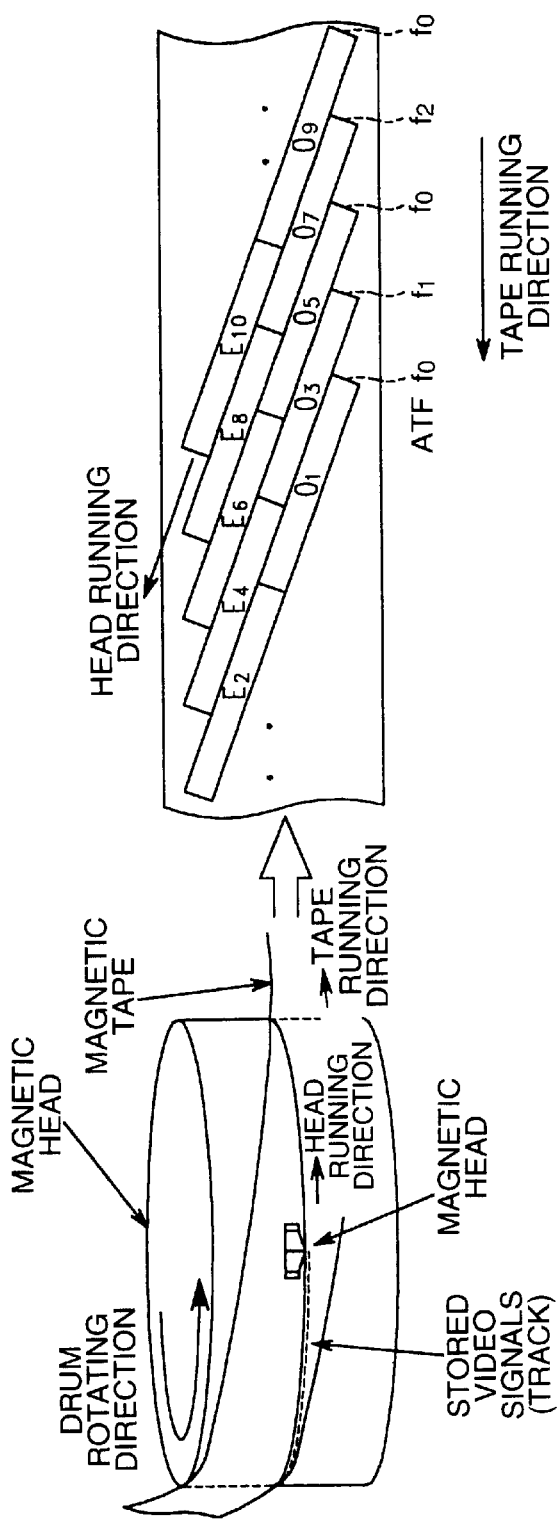
FIG. 3 shows a track pattern with which digital signals of the recording system of the present invention for recording video and audio data on a magnetic tape are recorded on a magnetic tape of a tape width of 8 mm.

FIG. 3 shows a track pattern which is formed when the digital signals of the digital 8 mm system according to the present invention have been recorded on a magnetic tape having a tape width of 8 mm. This magnetic tape is termed herein as an 8 mm tape.

In the digital 8 mm system, digital video signals are rotationally recorded on the 8 mm tape having a tape width larger than the DV tape. This 8 mm tape is the same as the magnetic tape used in the 8 mm system (IEC60843) for recording the conventional analog video signals. On a rotary drum for rotational recording, two magnetic heads, for example, having different azimuth angles, are arranged at diagonally opposite positions, on the opposite sides of the center of rotation, as in the conventional analog 8 mm system. Thus, these two magnetic heads scan the tape at a pre-set angle relative to the running direction of the 8 mm tape to form a track pattern shown in FIG. 3.

In the digital 8 mm system, 2-track data in the DV system are recorded in succession on a sole track of an 8 mm tape, with a data pattern of the DV system remaining unchanged. That is, in the digital 8 mm system, data of the odd tracks and data of the even tracks in the DV system are arranged as a set and recorded on a sole track.

For example, in the digital 8 mm system, data of the odd track O1 and data of the even track E2 in the DV system are arranged as a set and recorded on a sole track. On the next track, data of the odd track O3 and data of the even track E4 are arranged as a set and recorded. In similar manner, data of two consecutive tracks in the DV system, namely the odd track O5 and the even track E6, odd track O7 and the even track E8, and the odd track O9 and the even track E10, are arranged as sets and recorded on the ensuing tracks on the 8 mm tape.

Thus, in the digital 8 mm system, 1- frame video signals conforming to the NTSC system are recorded on five tracks of the 8 mm tape. Similarly, 1- frame video signals conforming to the PAL system are recorded on six tracks of the 8 mm tape.

Meanwhile, extension data are recorded, along with 2-track data in the DV system, on a sole track of the 8 mm tape.

Also, in the digital 8 mm system, pilot signals of three frequencies f0, f1 and f2 for ATF are superimposed onto each track by 24/25 conversion. That is, pilot signals of different frequencies are recorded every track in the digital 8 mm system or every two tracks in the DV system. Specifically, pilot signals of frequencies repeated in a sequence of . . . f0, f1, f0, f2, f0, f1, f0, f2, . . . are recorded in terms of a track composed of a set of an even track data and an odd track data in the DV system as a unit. If the pilot signals are recorded in this manner, when a magnetic head scans a track having recorded thereon the frequency f0, pilot components of the frequencies f1, f2 can be obtained from a neighboring track as crosstalk signals, thus enabling stable tracking to be applied during reproduction. It is noted that the pilot signals are also recorded in the extension data. The pilot signals recorded on the extension data are of the same frequency as that of the two-track data in the DV system recorded on the pertinent track.

Figure 4:
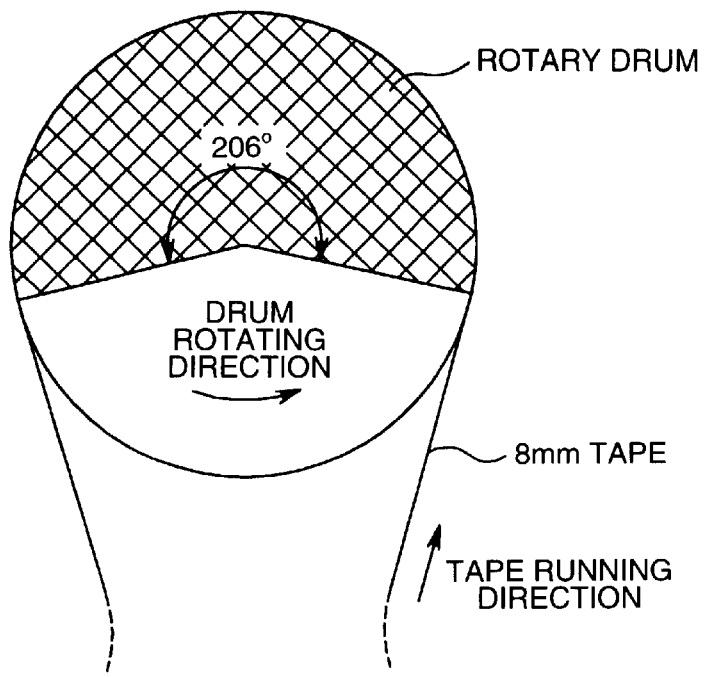
FIG. 4 illustrates a tape wrap angle on a rotary drum in the recording system embodying the present invention.

FIG. 4 shows a tape wrap angle to the rotary drum in the digital 8 mm system.

In the digital 8 mm system, the 8 mm tape is wrapped on the rotary drum over an angular extent of 206°. The signals recorded as the magnetic head is moved through the range of this wrap angle of 206° make up a sole track on the 8 mm tape. This wrap angle of the 8 mm tape may also be 211°, as in the conventional analog 8 mm system, with the signals being recorded over a 206° portion of this 211° angle.

Figure 5:
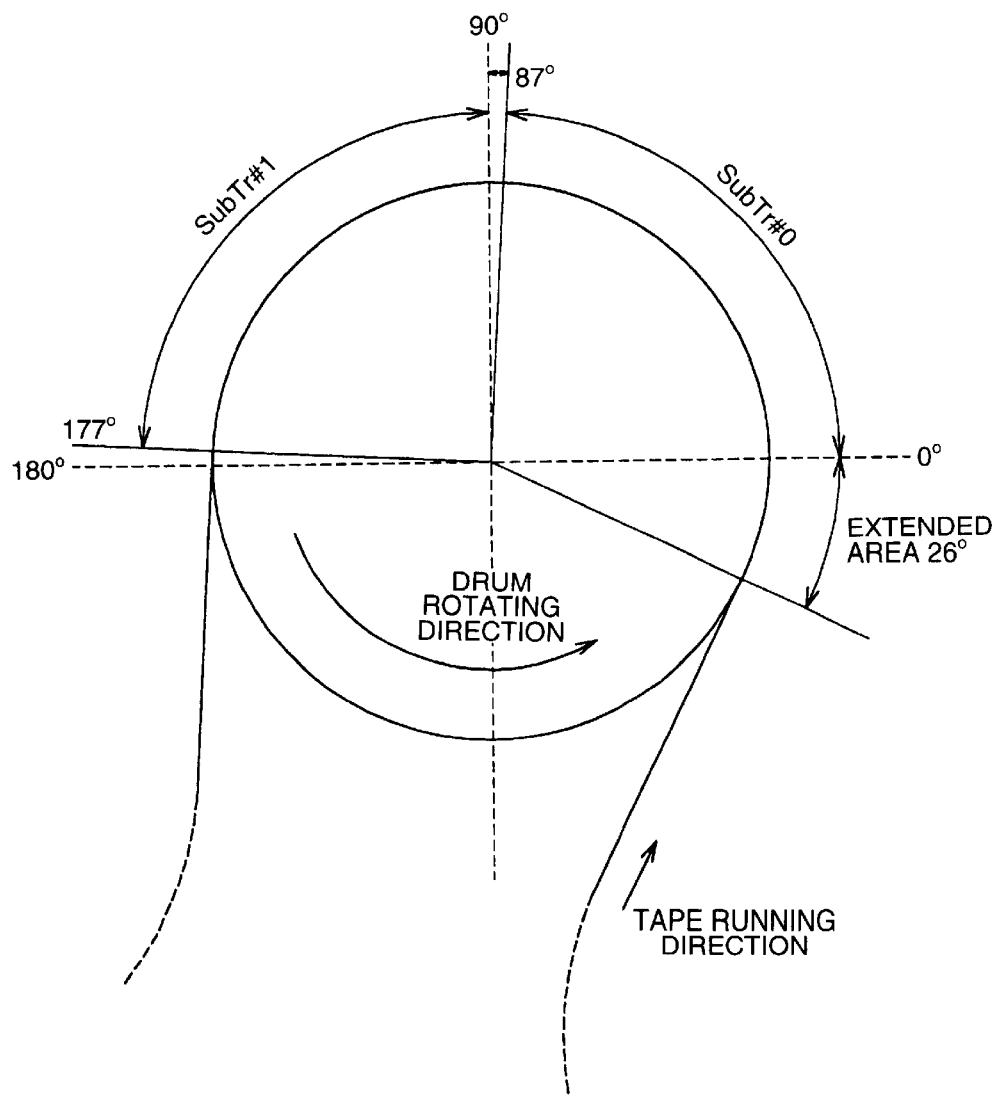
FIG. 5 illustrates the effective wrap angle in one track in the recording system embodying the present invention.
Figure 6:
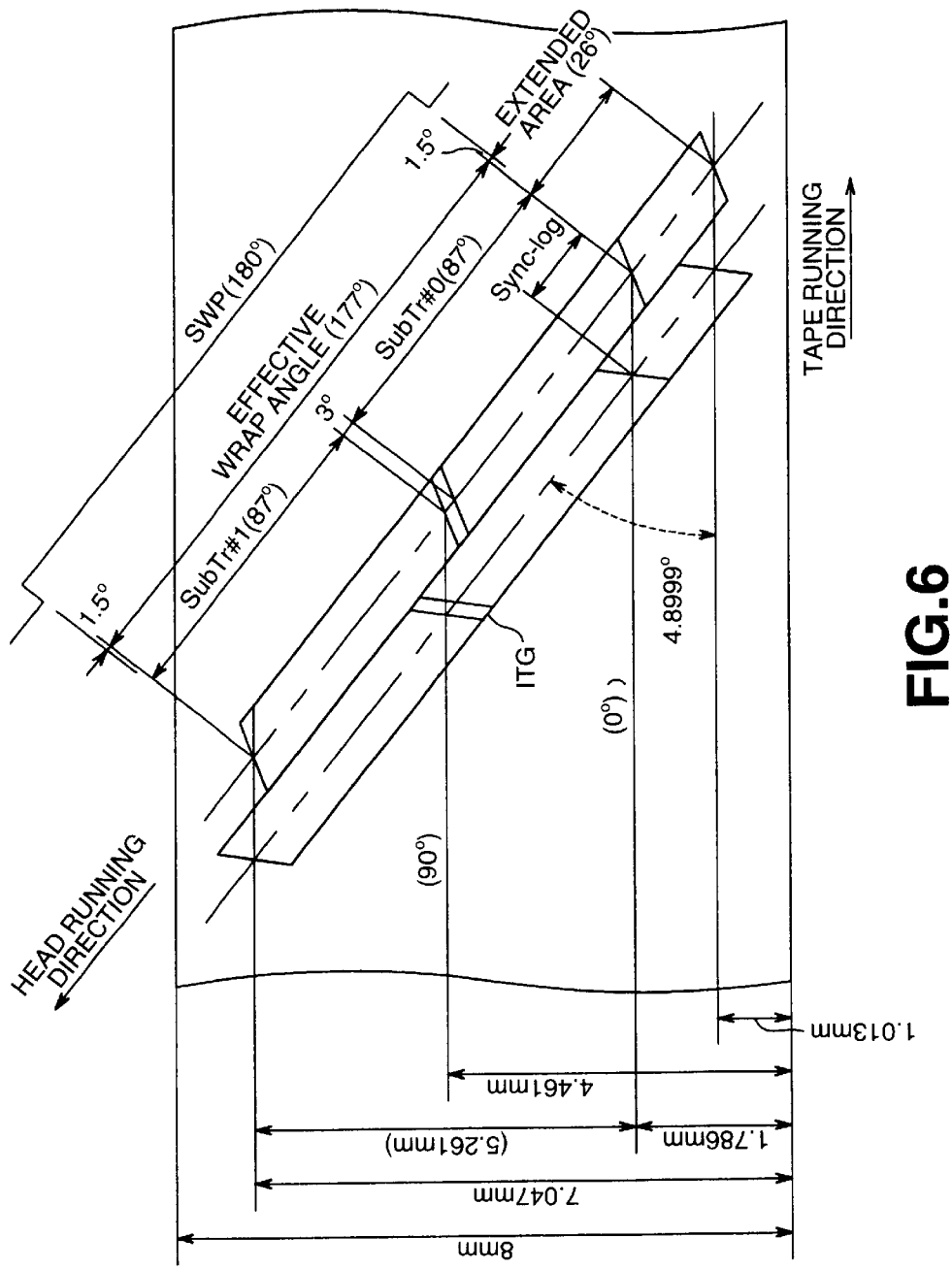
FIG. 6 shows a track pattern on a tape in the recording system embodying the present invention.

FIG. 5 illustrates the effective wrap angle within a track in the digital 8 mm system. FIG. 6 illustrates a track pattern on a tape in the digital 8 mm system.

In the digital 8 mm system, the effective wrap angle is 177°, as shown in FIGS. 5 and 6. Within this effective wrap angle, there are provided two sub-tracks (SubTr#0 and SubTr#1). Each sub-track is constituted over an extent of the wrap angle of 87°. 1-track data in the DV system are recorded on each sub-track in accordance with the data format of the DV system. That is, data of an odd track and an even track are recorded in succession track-by-track within the effective wrap angle. Within the effective wrap angle, there is provided a gap of 3° (ITG: Inter Track Gap) between the two sub-tracks (SubTr#0 and SubTr#1).

Also, in the present digital 8 mm system, there is provided an extension area upstream of the effective wrap angle, that is on the head entrance side of the track. The wrap angle of the extended area is 26°. Therefore, the wrap angle for one track is the sum of 26° for the extended area and 177° of the effective wrap angle, or 206°.

In addition, in this digital 8 mm system, the two magnetic heads provided on the rotary drum are changed over by a switching pulse SWP generated in a timed relation to the rotary phase of the rotary drum. At a time point when the recording of the data within the effective wrap angle by one of the magnetic heads, such as Ach, has come to a close, the switching pulse SWP is changed over, so that recording of data within the effective wrap angle of the other magnetic head, such as Bch, is started. This switching pulse SWP is changed over each time the rotary drum is rotated through 180°. Thus, a 1.5° margin is generated upstream and downstream of the effective wrap angle.

Meanwhile, the data of the extended area is synchronized with the synchronization information for the extended track (Ex-ITI) as later explained or with the synchronization information for the previous track (ITI) so that recording thereof is started before changing over the switching pulse SWP.

In the digital 8 mm system, the track angle of a track formed on an 8 mm tape, that is the angle between the head running direction and the tape running direction, is 4.8999°. On the other hand, the width from a longitudinal head entrance side of the 8 mm tape to the recording start position of the extended area is 1.013 mm. The width from the longitudinal head entrance side of the 8 mm tape to the recording start position of the effective wrap angle is 1.786 mm. The width from the longitudinal head entrance side of the 8 mm tape to the recording end position of the effective wrap angle is 7.047 mm. The width from the recording start position of the effective wrap angle to the recording end position of the effective wrap angle is 5.261 mm. The width from the head entrance longitudinal side of the 8 mm tape to the center position of the effective wrap angle, that is to the recording start position of the sub-track subTr#1 is 4.461 mm. It is noted that the widths on the 8 mm tape shown above represent the distance as measured in a direction perpendicular to the tape running direction.

The illustrative specifications of the recording system for a magnetic tape according to the present invention are tabulated below for the NTSC and PAL systems. The specifications for the conventional analog 8 mm system are also tabulated for comparison sake.

TABLE 1

| | specifications of digital 8 mm system (inventive) | | specifications of analog 8 mm system (conventional) |
|---|---|---|---|
| | NTSC 525/60 | PAL 625/50 | NTSC |
| drum diameter (mm) | 40 | 40 | 40 |
| drum rpm (1/sec) | 75/1.001 | 75 | 30/1.001 |
| number of tracks/drum rotation | 2 | 2 | 2 |
| number of tracks/frame | 5 | 6 | 2 |
| drum lead angle (°) | 4.885 | 4.885 | 4.885 |
| recording track angle (°) | 4.8999 | 4.8999 | 4.9037 |
| track length (177°, mm) | 61.597 | 61.597 | 62.593 (189°, mm) |

TABLE 2

| | specifications of digital 8 mm system (inventive) | | specifications of analog 8 mm system (conventional) |
|---|---|---|---|
| | NTSC 525/60 | PAL 625/50 | NTSC |
| effective wrap angle (°) | 177 | 177 | 180 |
| head azimuth Ach (°) | 10 | 10 | 10 |
| head azimuth Bch (°) | −10 | −10 | −10 |
| tape width (mm) | 8 | 8 | 8 |
| record start tape height (mm) | 1.786 | 1.786 | 1.786 |
| record end tape height (mm) | 7.047 | 7.047 | 7.137 |
| effective recording width (mm) | −5.261 | −5.261 | 5.351 |

TABLE 3

| | specifications of digital 8 mm system (inventive) | | specifications of analog 8 mm system (conventional) |
|---|---|---|---|
| | NTSC 525/60 | PAL 625/50 | NTSC |
| track pitch ($\mu$m) | 16.34 | 16.34 | 20.5 (SP) |
| tape speed (mm/sec) | 28.695/1.001 | 28.695 | 14.345 |
| relative speed (mm/sec) | 9.3962/1.001 | 9.3962 | 3.75 |
| minimum recording wavelength ($\mu$m) | 0.449/1.001 | 0.449 | 0.37 (Hi8, NTSC) |
| recording rate (Mbps) | 41.85 | 41.85 | — |
| data (bits) | 274624 | 274350 | — |
| Sync-lag ($\mu$sec) | 20.305 | 20.285 | |

In the recording system for the magnetic tape, according to the present invention, as described above, since two-track data of the DV system are recorded in succession on one track of an 8 mm tape in the same data pattern as the DV pattern, the tape area can be used effectively to enable recording over longer time. Stated differently, if the recording is to be made for the same time duration, a shorter tape length suffices in comparison with the case of recording DV track patterns one-by-one on the 8 mm tape, thus contributing to reduction in tape consumption.

Of course, this recording system is merely illustrative such that three, four or a larger number of tracks of the DV system can be recorded in succession. This enables recording over longer time. Conversely, for recording over the same time length, the required length of the tape can be reduced further.

Also, if this recording system is used, a mechanical deck portion of the conventional 8 mm video tape recorder can directly be used to form the above-mentioned track pattern on the 8 mm tape if the rpm of the rotary drum of the recording/reproducing device is changed from 1800 to 4500.

Meanwhile, the capstan speed, that is the tape feed rate, simply governs the track pitch. The necessary track pitch is an item set depending on head characteristics or on possible compatibility and hence may be set if so required.

The data format of data recorded in the effective wrap angle and that of data recorded in the extended area are explained in detail. Meanwhile, the area within the effective wrap angle is termed herein a usual area for distinction from the extended area.

Figure 7:
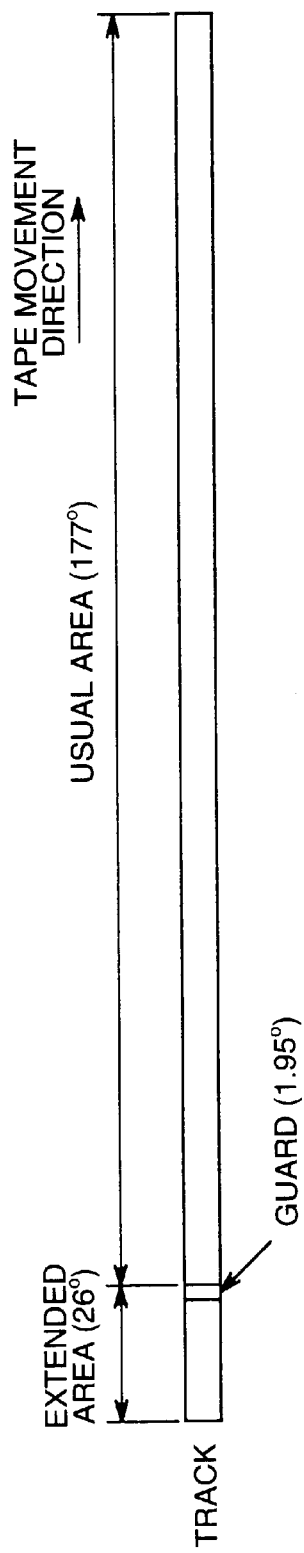
FIG. 7 illustrates a track data pattern in the recording system embodying the present invention.

In the digital 8 mm system, a guard area is provided between the extended area and the usual area, as shown in FIG. 7. The wrap angle for this guard area is 1.95°.

The usual area is made up of a first sub-track (SubTr#0), on which are recorded one-track data of the DV system in the same data pattern as that of the DV system, the gap ITG and a second sub-track (SubTr# 1), on which are recorded one-track data of the DV system. In this usual area, there are recorded 274624 bits and 274350 bits for the NTSC system and for the PAL system, respectively.

On the first sub-track (SubTr#0), there are sequentially recorded a preamble of 1400 bits, the track synchronization information or ITI (Insert and Track Information) of 1920 buts, a postamble of 280 bits, a gap of 625 bits, a preamble of 500 bits, audio data of 10500 bits, a postamble of 550 bits, a gap of 700 bits, a preamble of 500 bits, video data of 111750 bits, a postamble of 975 bits, a gap of 1550 bits, a run-up of 1200 bits, a sub-code of 1200 bits and a guard area of 1200 bits, looking from the head entrance side . In the PAL system, the last guard area is of 1335 bits. It is noted that data recorded in this first sub-track (Sub-track#0) is the same data as that recorded in a sole track in the DV system.

In the second sub-track (SubTr#1), data similar to that for the first sub-track is recorded.

In the gap ITG, there are provided an erasure margin of 1250 bits and a gap of 2150 bits (2155 bits for the PAL system).

In the extended area, there are sequentially recorded, for the NTSC system, a preamble of 1400 bits, the track synchronization information for extension (EX-ITI) of 1920 bits, a postamble of 280 bits, a gap of 2325 bits, a preamble of 500 bits, first extension data (Ex-DATA) of 10500 bits, a postamble of 550 bits, a gap of 2325 bits, a preamble of 500 bits, second extension data (EX-DATA) of 10500 bits, a postamble of 550 bits, a gap of 2325 bits, a run-up of 1200 bits, a sub-code for extension (Ex-SubCode) of 1200 bits, a guard area of 1200 bits, and a gap of 3065 bits, looking from the head entrance side. In the PAL system, the last guard area is of 1335 bits.

The track synchronization information for the extended area is used as the reference for the time axis and for tracking servo, as is the track synchronization information of the DV system. The extension sub-code for the extended area is similarly used as the subsidiary information for the video or audio data, as is the sub-code for the DV system.

In the area for first and second extension data, it is possible to record audio data of the same configuration as that of the audio data area of the usual area. Thus, audio data can be recorded in the extension area independently of the usual area so that post-recording can be performed easily. If the audio data is recorded in the extension area, the time codes for the recorded audio data or the switching information to the audio data of the usual area can be recorded as the sub-code for extension.

In this area for extension data, it is possible to record a telop picture, a still picture or other digital information.

By providing this extension area, audio data or picture data can be post-recorded in the digital 8 mm system without overwriting the data recorded on the usual area. In particular, post-recording can be realized positively by providing a sufficient gap and the track synchronization information for the data of the extension area. In the DV system, in which the sub-code is at back of a track, it is difficult to rewrite only the sub-code due to linearity. Conversely, the sub-code of the extension area is in the vicinity of the area for extension and hence only the subcode can be rewritten easily.

The recording/reproducing apparatus for recording video and audio data using the above-described digital 8 mm system is now explained.

Figure 10:
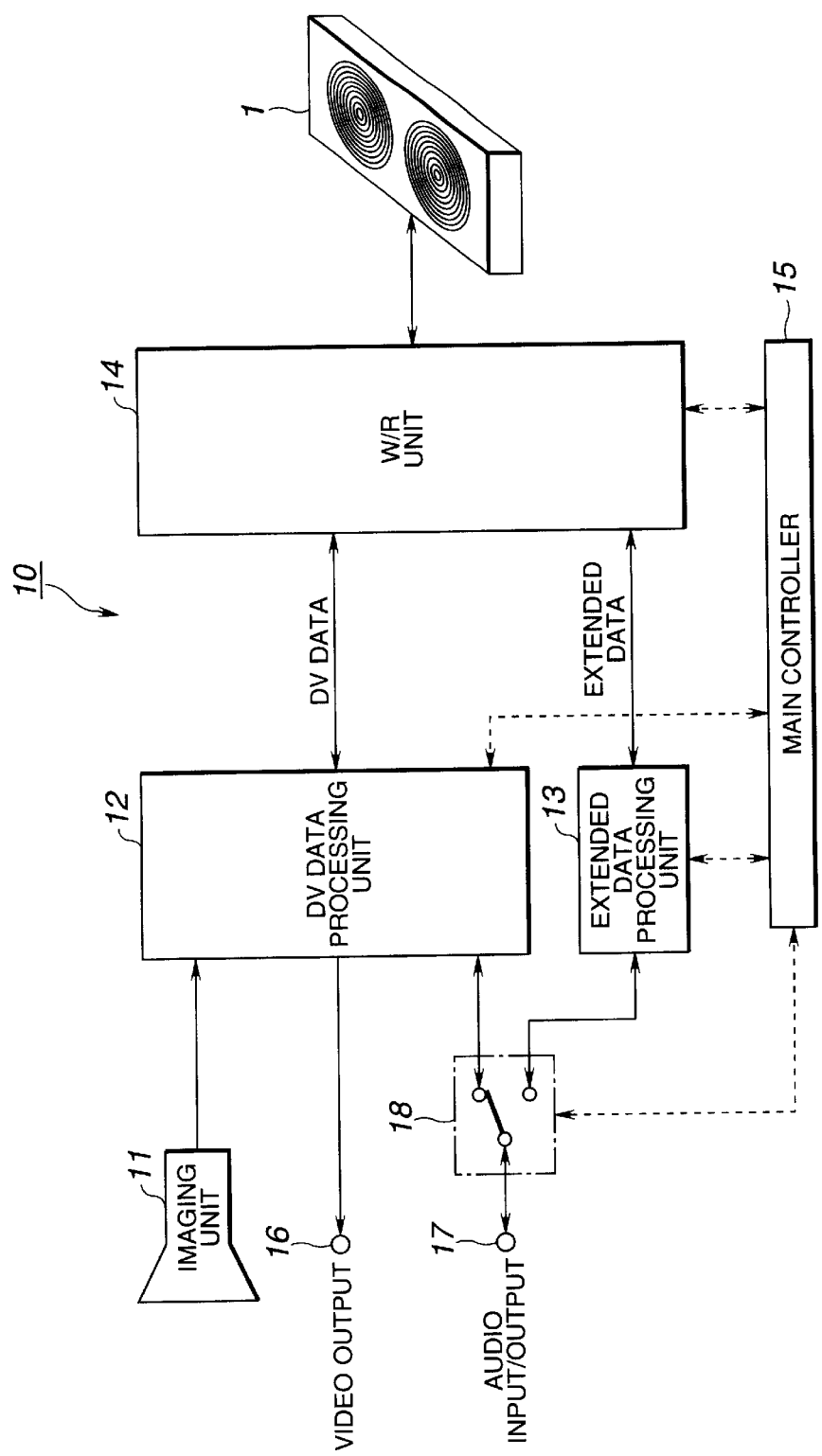
FIG. 10 is a block diagram of a recording/reproducing apparatus embodying the present invention.

FIG. 10 shows a schematic structure of a recording/reproducing apparatus 10 embodying the present invention.

The recording/reproducing apparatus 10 is a so-called camera built-in type video tape recorder and is configured for recording video data etc of the above-described digital 8 mm system on an 8 mm tape 1 or reproducing the video data etc from this 8 mm tape 1.

The recording/reproducing apparatus 10 includes an image pickup unit 11 for imaging an object to output analog video signals, a DV data processing unit 12 for converting the DV data read out from the 8 mm tape 1 into analog video signals, and an extension data processing unit 13 for generating extension data for recording on the extension area of the 8 mm tape 1 and for processing the extension data read out from the extension area. The recording/reproducing apparatus 1 also includes a write/readout unit 14 for writing/reading data for the 8 mm tape 1 and a controller 15 for controlling various component units. The recording/reproducing apparatus 10 moreover includes a video output terminal 16 for outputting analog video signals, an audio input/output terminal 17 for inputting/outputting audio signals and a switch 18 for supplying audio signals supplied from the audio input/output terminal 17 to the DV data processing unit 12 or to the extension data processing unit 13 in a switching manner or outputting audio signals outputted from the DV data processing unit 12 or the extension data processing unit 13 in a switching manner at an audio input/output terminal.

The image pickup unit 11 is made up of an optical system, such as lenses, a CCD and an electric system, such as signal processing circuits. The image pickup unit 11 generates analog video signals (luminance signals, red chroma signals or blue chroma signals) to route the analog video signals to the DV data processing unit 12.

Figure 8:
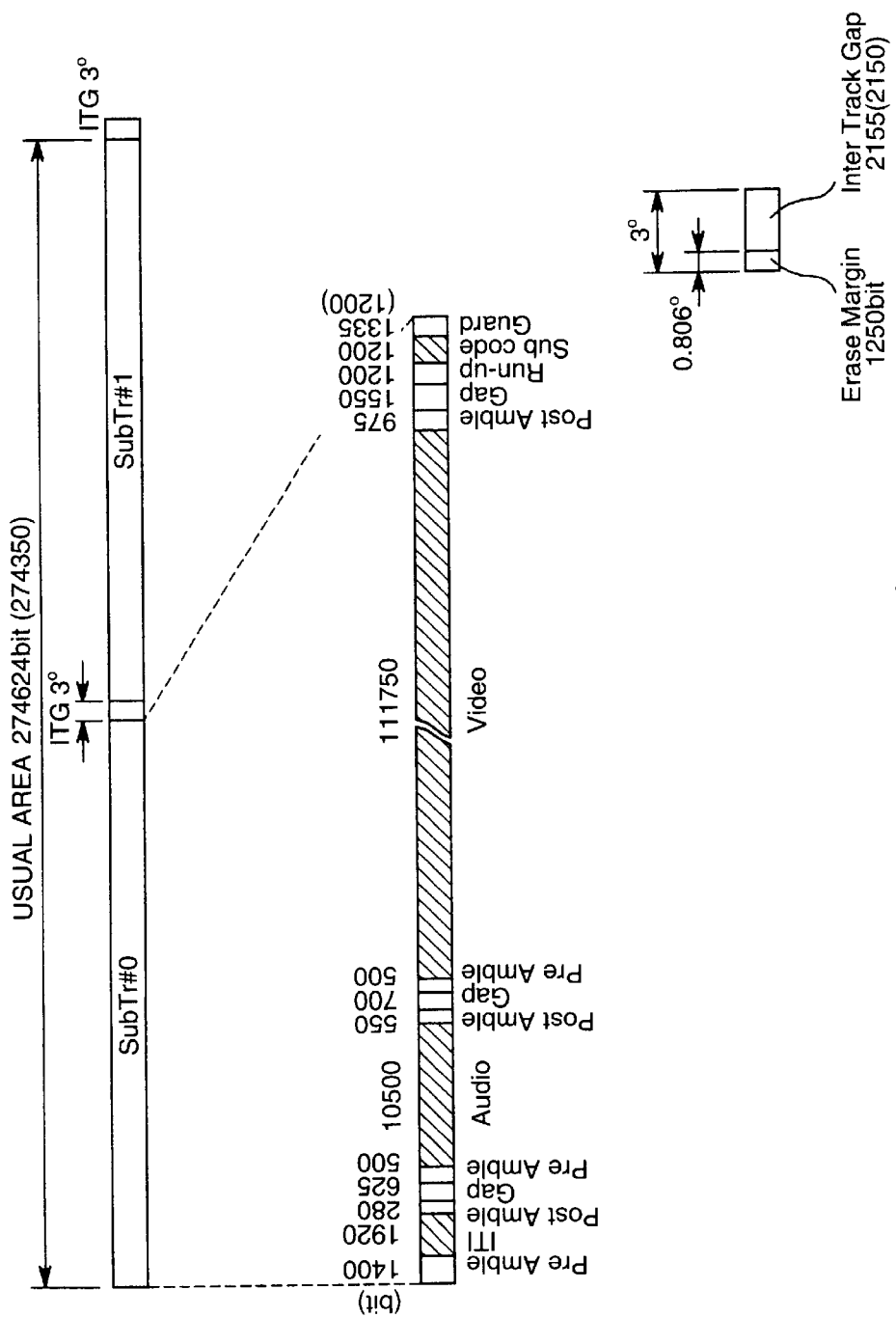
FIG. 8 illustrates a data pattern for a usual track area in the recording system embodying the present invention.

The DV data processing unit 12 is fed during recording with analog video signals from the image pickup unit 11, analog audio signals from outside via audio input/output terminal 17 and with the subsidiary information from the main controller. During recording, the DV data processing unit 12 converts these signals and the information into a data format conforming to the DV system as shown in FIG. 8 and routes the signals or the information to the write/readout unit 14 in terms of data of one track in the DV system, that is data written in SubTr#0 or SubTr#1, as a unit. Also, during reproduction, the DV data processing unit 12 is fed from the write/readout unit 14 with DV data read out from the usual area, that is the area within the effective wrap angle, of the 8 mm tape 1. During reproduction, the DV data processing unit 12 separates video data, audio data and the subsidiary information from the DV data. The DV data processing unit 12 converts the separated video data into analog video signals which then are outputted to outside via video output terminal 16. Also, the DV data processing unit 12 converts the separated audio data into analog audio signals which then are outputted via the audio input/output terminal 17. The DV data processing unit 12 routes the separated subsidiary information to the main controller 15.

Figure 9:
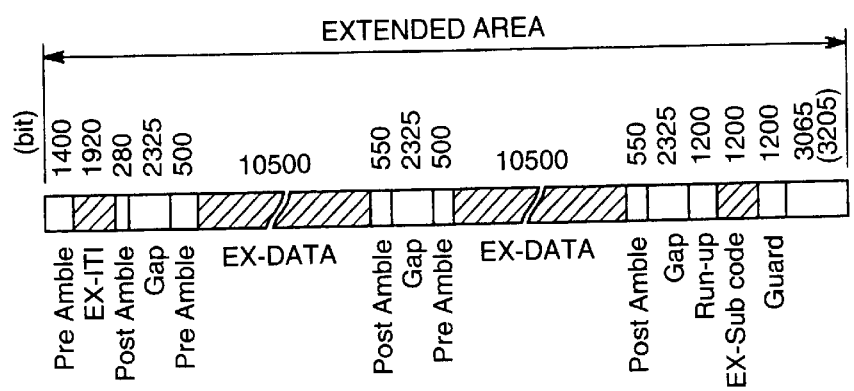
FIG. 9 illustrates a data pattern of an extension area of a track in the recording system embodying the present invention.

During recording or audio post-recording, the extension data processing unit 13 is fed with audio signals from outside via audio input/output terminal 17 and with the subsidiary information sent from the main controller. The extension data processing unit 13 converts these signals and the information into a data format for recording in the extension area shown in FIG. 9 to route the converted signal or information to the write/readout unit 14 as extension data for recording in the extension area. Also, during reproduction, the extension data read out from the extension area of the 8 mm tape 1 is routed to the extension data processing unit 13 from the write/readout unit 14. The extension data processing unit 13 separates the audio data and the subsidiary information from the extension data. The extension data processing unit 13 converts the separated audio data into analog audio signals which then are outputted via the audio input/output terminal 17. The extension data processing unit 13 also routes the separated subsidiary information to the main controller 15.

Meanwhile, the extension data processing unit 13 performs 24/25 conversion on the extension data for recording in order to record pilot signals. These pilot signals are of the same frequency as that of the pilot signals recorded on the DV data to be recorded on the track.

If, during recording, audio signals are recorded in the audio area in the usual area, the switch 18 sets its movable contact to the side of the DV data processing unit 12 to route the audio signals to the DV data processing unit 12. If, during recording or post-recording, audio data is to be recorded in the extension area, the switch 18 sets its movable terminal to the side of the extension data processing unit 13 to route the audio signals to the extension data processing unit 13. If, during reproduction, audio data in the usual area is to be outputted, the switch 18 sets its movable terminal to the side of the DV data processing unit 12 to route the audio signals outputted by the DV data processing unit 12 from the audio input/output terminal. If, during reproduction, audio data in the usual area is to be outputted, the switch 18 sets its movable terminal to the side of the extension data processing unit 13 to route the audio signals outputted by the extension data processing unit 13 at the audio input/output terminal.

The write/readout unit 14 controls the switching of the magnetic heads, rotary drum rotation or the running speed of the 8 mm tape 1 to effect write/readout of the DV data and the extension data for the usual area and the extension area.

The main controller 15 controls the DV data processing unit 12, extension data processing unit 13 and the write/readout unit 14, while generating the subsidiary information supplied to the DV data processing unit 12 and to the extension data processing unit 13 and processing the subsidiary information read out from the 8 mm tape 1. The main controller 15 also controlling the switching operation of the switch 18.

The structure and the processing contents of the DV data processing unit 12 are explained in further detail.

Figure 11:
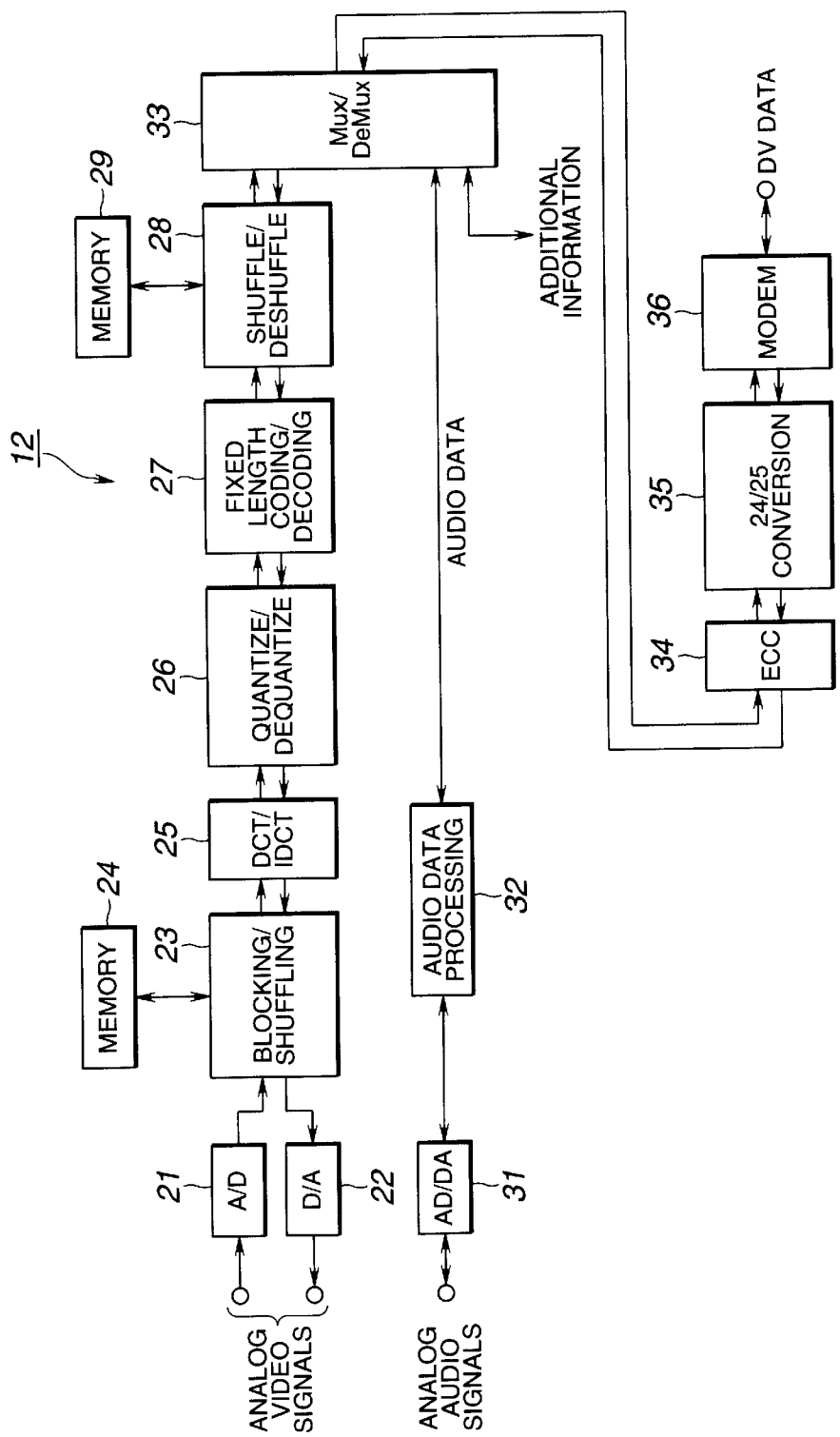
FIG. 11 is a block diagram of a DV data processing unit of a recording/reproducing apparatus embodying the present invention.

FIG. 11 shows the block structure of the DV data processing unit 12.

The DV data processing unit 12 includes an A/D converter 21, a D/A converter 22, a blocking/shuffling unit 23, a memory 24, a discrete cosine transform/inverse discrete cosine transform (DCT/IDCT) unit 25, a quantizer/dequantizer 26, a fixed length unit 27, a shuffling/deshuffling unit 28, a memory 29, an AD/DA converter 31, an audio data processor 32, a multiplexer/demultiplexer 33, an ECC unit 34, a 24/25 converter 35 and a modem 36.

First, the processing contents of the DV data processing unit 12 during recording are explained.

The analog video signals (luminance signals Y, red chroma signals CR and blue chroma signals CB) sent from the image pickup unit 11 are converted into digital signals by the A/D converter 21. The video signal, digitized by the A/D converter 21, are sent to the blocking/shuffling unit 23.

The blocking/shuffling unit 23 performs blocking and shuffling on the video data. The blocking is the processing of separating the video data (luminance signals Y, red chroma signals CR and blue chroma signals CB) into 8×8 pixel blocks as basic units for DCT. Meanwhile, the four blocks of the luminance data Y and each one block of the chroma data CR, CB, totalling at six blocks, are treated as a processing unit. This processing is termed a macro-block. The shuffling is the processing of interchanging data, every five macro-blocks, for averaging the volume of the compressed data over the entire picture. The blocking and shuffling are performed on the memory 24. The blocked and shuffled video data are sent to the DCT/IDCT unit 25.

The DCT/IDCT unit 25 applies DCT to the input video data to effect orthogonal transform on the video data to send the resulting data to the quantizer/dequantizer 26.

The quantizer/dequantizer 26 divides the DCT coefficients with an integer termed a quantization step to effect quantization. Such a quantization step which gives the maximum number of as-quantized bits not exceeding a target number of bits is selected in order to perform quantization. The quantizer/dequantizer 26 zigzag-scans the DCT coefficients, quantized on the block basis, from data of the DC component, by way of performing variable length encoding. The video data, thus quantized and variable-length encoded, is routed to the fixed length unit 27.

The fixed length unit 27 packs the input video data every five sync blocks. The sync block denotes a small area obtained on separating the tracks of the magnetic tape (8 mm tape 1 and DV tape). Specifically, the recording area on the track on the magnetic tape is divided into small areas termed sync blocks. It is into this unit that the video data are packed. In the DV system, the number of the sync blocks included in each track is 135. In the digital 8 mm system, in the embodiment of the present invention, since the two-track data in the DV system are recorded on one track, the number of the sync blocks included in each block is twice that number, or 270. The video data packed every five sync blocks, are routed to the shuffling/deshuffling unit 28.

The shuffling/deshuffling unit 28 interchanges video data, packed every five sync blocks, on the memory 29, so that the data can be reproduced with a temporal data flow as approximate to the original temporal flow of the image as possible. The interchanged video data are routed to the multiplexer/demultiplexer 33.

The analog audio signals, supplied from an external microphone or a speech input terminal, are converted into digital data by the AD/DA converter 31. The audio data, digitized by the AD/DA converter 31, are routed to the audio data processor 32.

The audio data processor 32 converts the input audio data into a data format conforming to the DV system, such as by packing the audio data every sync block, to route the resulting data to the multiplexer/demultiplexer 33.

The main controller 15 sends the subsidiary information for recording on the sub-code, ITI, video AUX or audio AUX, to the multiplexer/demultiplexer 33. The main controller 15 also routes the information on tracks, video data titles or audio data titles, to the multiplexer/demultiplexer 33.

The multiplexer/demultiplexer 33 multiplexes the video data, audio data and the subsidiary information, supplied thereto, to form one-track data in the DV system. The multiplexed data is routed to the ECC unit 34 in terms of one-track data in the DV system as a unit.

The ECC unit 34 appends error correction codes to the data supplied thereto in terms of one-track data in the DV system as a unit. The ECC unit 34 appends an inner parity and an outer parity independently to each of the video data, audio data and to the subsidiary information. The data, having appended thereto the error correction codes, are routed to the 24/25 converter 35.

The 24/25 converter 35 applies 24/25 conversion to the furnished data and superimposes pilot signals of three frequencies f0, f1 and f2 for ATF on the data. This 24/25 converter 35 records the pilot signals with different frequencies every track in the digital 8 mm system. Specifically, the 24/25 converter 35 appends the same pilot signals every two-track data of the DV system. The 24/25 converted data is routed to the modem 36.

The modem 36 applies channel coding to the data for recording in order to convert the data string into conformity to the digital recording/reproducing system.

During recording, the DV data processing unit 12 outputs the data, processed as described above, as the DV data.

The processing contents of the DV data processing unit 12 during reproduction is now explained.

During reproduction, the DV data, read out from the 8 mm tape 1 by the write/readout unit 14, is routed to the DV data processing unit 12.

The modem 36 demodulates the channel-coded data to route the demodulated data tote 24/25 converter 35, which then removes the extra bit appended to the demodulated 24-bit data by way of conversion to the pre-24/25-conversion data. The 24/25 converter 35 routes the data, freed of the extra bit, to the ECC unit 34. The ECC unit 34 effects error correction based on the error correction codes appended to the video data, audio data and the subsidiary information. The data, now corrected for errors, is routed to the multiplexer/demultiplexer 33.

The multiplexer/demultiplexer 33 separates the video data, audio data and the subsidiary information, multiplexed every track in the DV system. The separated subsidiary information is sent to the main controller 15. The separated audio data is processed by the audio data processor 32 and subsequently converted by the AD/DA converter 31 into analog signals which are then outputted to outside. The separated video data are sent to the shuffling/deshuffling unit 28.

The video data is deshuffled by the shuffling/deshuffling unit 28, depacked by the fixed length unit 27 and dequantized by the quantizer/dequantizer 26 so as to be then sent to the blocking/shuffling unit 23. The blocking/shuffling unit 23 deshuffles and deblocks the input video data to send the resulting data to the D/A converter 22.

The D/A converter 22 converts the digital video data to analog video data which then is outputted to an external device.

During reproduction, the DV data processing unit 12 reads out the DV data from the 8 mm tape 1 to output analog video and audio signals.

The structure and the processing contents of the write/readout unit 14 are explained in further detail.

Figure 12:
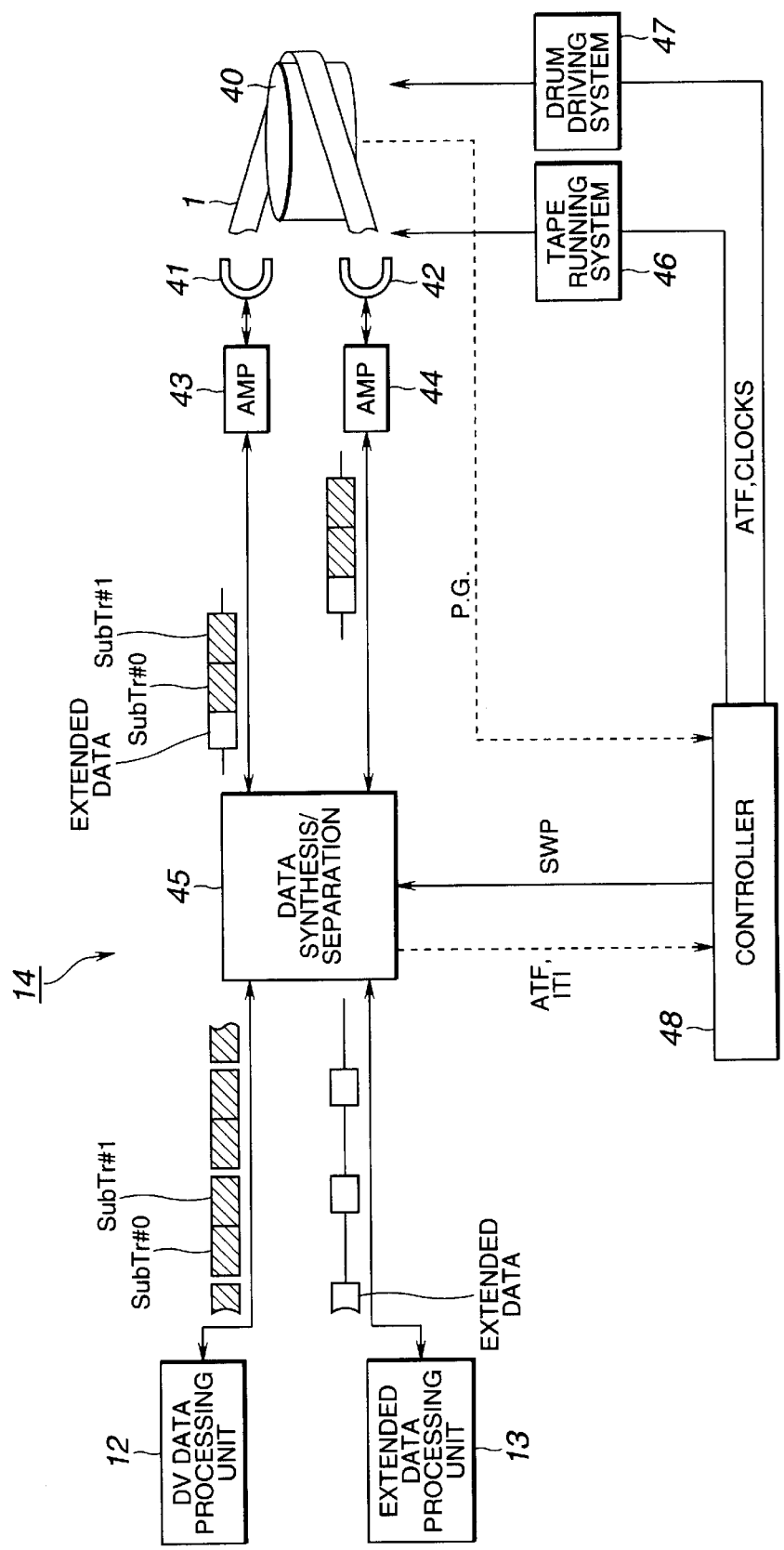
FIG. 12 is a block diagram of a write/readout unit of a recording/reproducing apparatus embodying the present invention.

FIG. 12 shows the block diagram of the write/readout unit 14.

The write/readout unit 14 includes a rotary drum 40, a first magnetic head 41 and a second magnetic head 42, provided on the rotary drum 40, a first amplifier 43 for driving the first magnetic head 41, a second amplifier 44 for driving the second magnetic head 42, a data synthesis/separation unit 45 for synthesizing and separating the DV data and extension data for recording, a tape running system 46 for running the 8 mm tape 1, a drum driving system 47 for driving the rotary drum 40 and a controller 48.

The rotary drum 40 has wrapped thereon the 8 mm tape 1. On this rotary drum 40, the first magnetic head 41 and the second magnetic head 42 are mounted at diametrically opposite positions, that is on the opposite sides of the center of rotation.

The first magnetic head 41 and the second magnetic head 42 are run on the 8 mm tape 1 at an angle of 4.8999° relative to the longitudinal direction, as the rotary drum 40 is run in rotation, to record/reproduce the signals. The first magnetic head 41 and the second magnetic head 42 are changed over depending on the rotational position of the rotary drum 40 to record/reproduce the signals. This switching occurs in synchronism with the switching pulse SWP generated by the controller 48. The controller 48 generates the switching pulse SWP, switched between high and low each 180° rotation of the rotary drum 40, based on the PG signals indicating the rotational phase of the rotary drum 40. During the high period of the switching pulse SWP, the first magnetic head 41 is selected to record/reproduce the signals, whereas, during the low period of the switching pulse SWP, the second magnetic head 42 is selected to record/reproduce the signals.

During usual recording and reproduction, the tape running system 41 causes the 8 mm tape 1 to be run at a constant speed.

During usual recording and reproduction, the drum driving system 47 rotationally drives the rotary drum 40 at a constant 4500 rpm.

During reproduction, the drum driving system 47 controls the rotational phase of the rotary drum 40 to control the tracking of the first magnetic head 41 and the second magnetic head 42. The rotational phase of the rotary drum 40 is controlled responsive to the ATF pilot signals detected by the data synthesis/separation unit 45. Specifically, the ATF pilot signals are superimposed on the data recorded in each track. When the first magnetic head 41 or the second magnetic head 42 scans the track having the frequency f0 recorded thereon, the controller 48 detects the f1 or f2 pilot signals as cross-talk signals and applies tracking so that the pilot signals from the neighboring track will be equal to each other.

Also, during reproduction or overwriting, the controller 48 detects the ITI or EX-ITI to control the recording or reproducing position of the magnetic head in the track. For example, when rewriting only the audio data, only the video data, only the sub-code or only the extension data, the controller 48 performs control so that data overwriting will be started when the magnetic head is at a pre-set position on a given track and so that new data will not be written on data of other portions. Specifically, when the rewriting the audio data of the usual area or the video data of the usual area, the ITI recorded at the leading end of the track of the usual area is detected to generate clocks to perform writing control of the rotary drum 40, first magnetic head 41 and the second magnetic head 42. When rewriting the extension data of the extended area or the sub-codes of the extension area, the EX-ITI recorded at the leading end of the extension area is detected to generate clocks to perform writing control of the rotary drum 40, first magnetic head 41 and the second magnetic head 42.

If, beginning from the state in which only data of the usual area has been recorded, with there not being recorded the data of the extension area, the ITI of the usual area of the previous track may be used to generate clocks. Since the distance from the ITI detection up to the extension area is protracted, an error is likely to be produced. However, there is raised no problem since sufficient gap or guard is provided in the extension area.

During recording, the data synthesis/separation unit 45 is fed from the DV data processing unit 12 with the DV data, while being fed from the extension data processing unit 13 with the extension data. During recording, this data synthesis/separation unit 45 separates the DV data into sets of two tracks in accordance with the DV system, while synthesizing the separated DV data and one-track extension data to form one-track data in the digital 8 mm system. The data synthesis/separation unit 45 switches the magnetic head for recording, responsive to the switching pulse SWP, to send the one-track data to the selected magnetic head.

During reproduction, the data synthesis/separation unit 45 is fed from the first magnetic head 41 and the second magnetic head 42 with data read out from the 8 mm tape 1. The data synthesis/separation unit 45 separates the one-track data supplied from the first magnetic head 41 and the second magnetic head 42 into the 2-track DV data in the DV system read out from the usual area and the extension data read out from the extension area. As the data synthesis/separation unit 45 switches the reading magnetic head depending on the switching pulse SWP, it routes the separated DV data to the DV data processing unit 12 and routes the separated extension data to the extension data processing unit 13.

The switching timing of the first magnetic head 41 and the second magnetic head 42 during recording of the present recording/reproducing apparatus 10 is now explained in comparison with the switching timing of the magnetic head during recording of the conventional recording/reproducing apparatus of the DV system.

Figure 13:
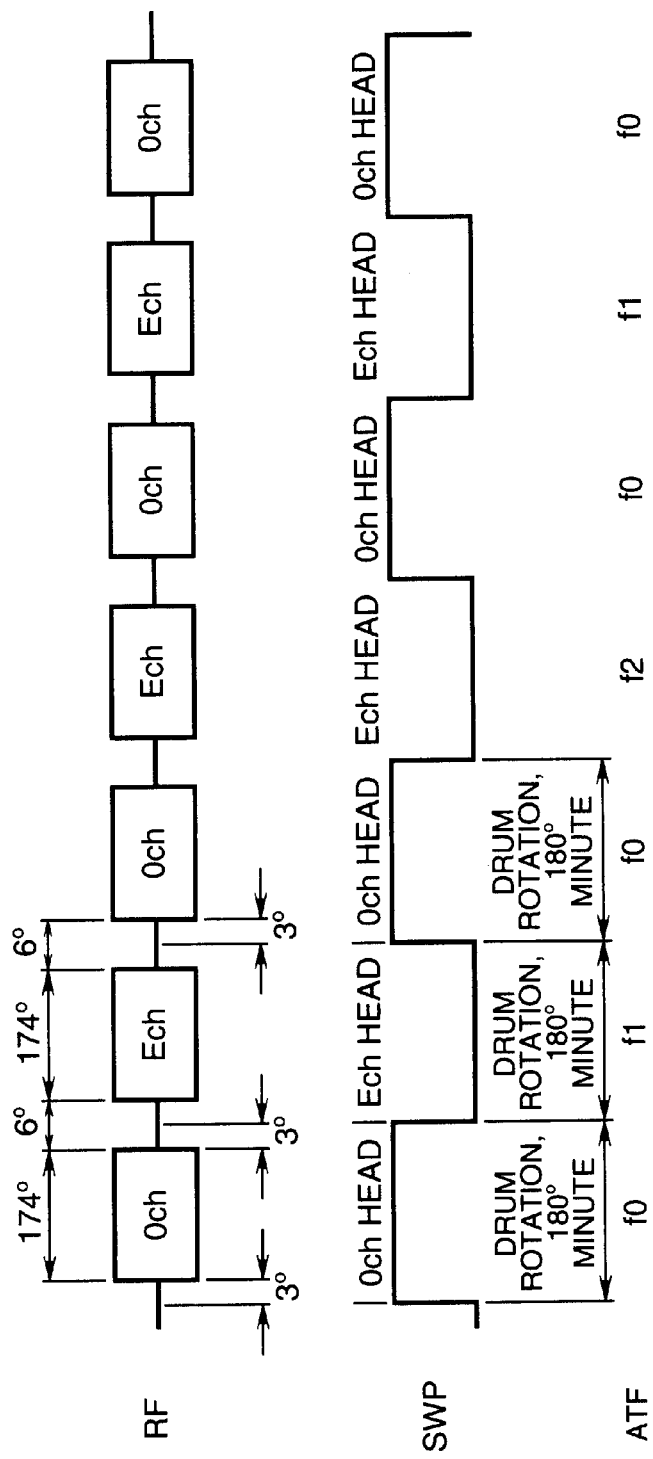
FIG. 13 illustrates the switching timing of a magnetic head during recording on the recording/reproducing apparatus of the DV system and the sequence of ATF pilot signals.
Figure 14:
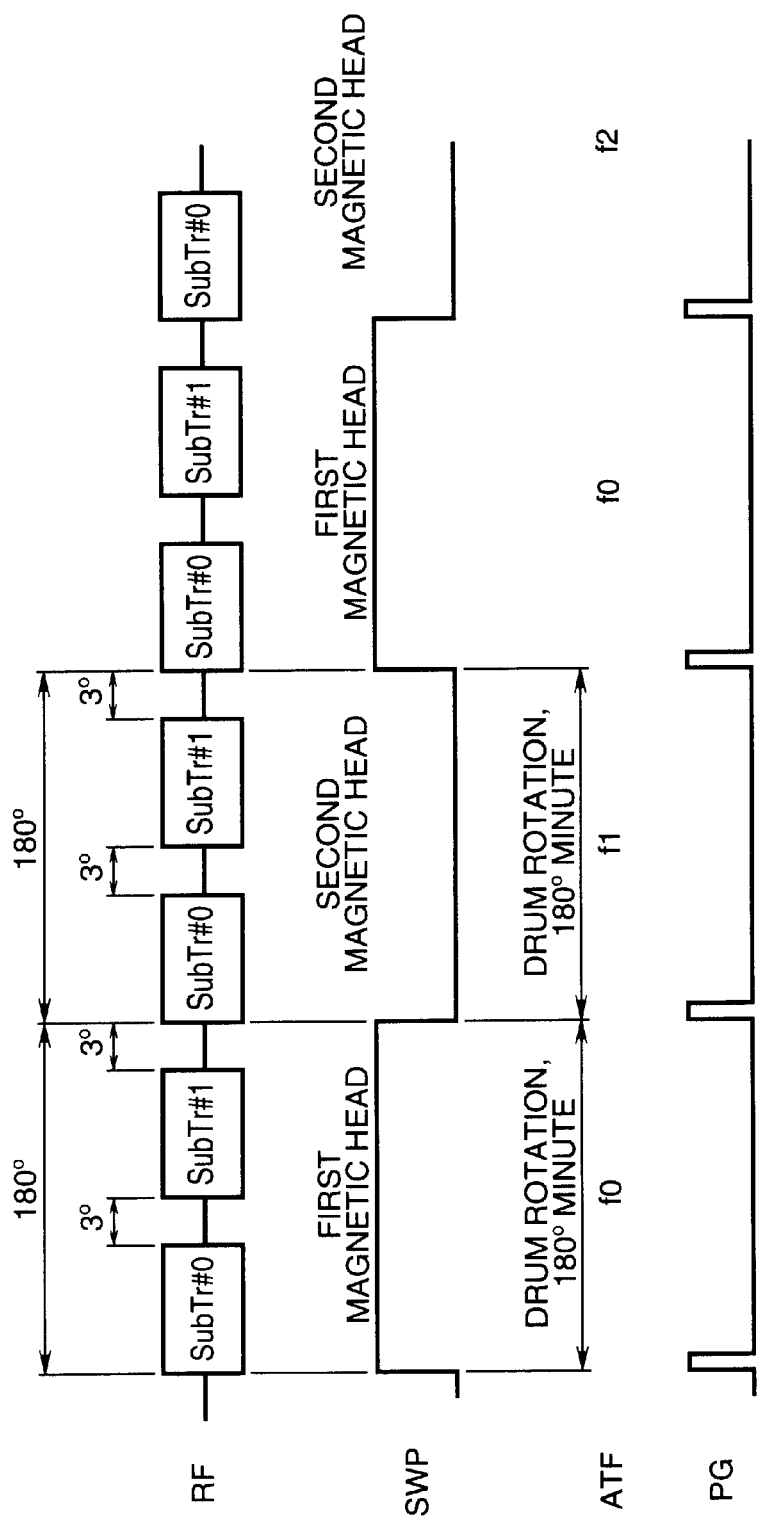
FIG. 14 illustrates the switching timing of a magnetic head during recording on the recording/reproducing apparatus embodying the present invention and the sequence of ATF pilot signals.

FIG. 13 shows the switching timing of the magnetic head during recording of the conventional recording/reproducing apparatus of the DV system and the sequence of the ATF pilot signals. FIG. 14 shows the switching timing of the magnetic heads 41, 42 during recording of the present recording/reproducing apparatus of the DV system and the sequence of the ATF pilot signals. It is noted that, in the conventional recording/reproducing apparatus of the DV system, the diameter of the rotary drum is 21.7 mm, and the drum rpm is 9000, whereas, in the present recording/reproducing apparatus 10, the rum diameter is 40 mm, as described above, with the drum rpm being 4500, similarly as described above.

In the conventional recording/reproducing apparatus of the DV system, shown in FIG. 13, the RF signals are of the clock frequency (recording rate/head) of 41.85 Mbps, these RF signals being comprised of alternately arranged odd track data (Och) and even track data (Ech). The RF signals of the odd track (Och) and those of the even track (Ech) are each of a length corresponding to the drum rotational angle of 174° and an interval corresponding to the drum rotational angle of 3° is provided between the odd track (Och) and the even track (Ech).

The two heads arranged on the rotary drum operate as a head for the even track data (Ech) and as a head for the odd track (Och). These two heads are switched by the switching pulse SWP for head switching each 180° drum rotation.

Thus, the RF signals of the odd track (Och) and those of the even track (Ech) are each formed on a sole track each 174° drum rotation.

On the other hand, the ATF pilot signals in the conventional recording/reproducing apparatus of the DV system are recorded in a track comprised of alternate array of odd tracks (Och) and even tracks (Ech) in a repetitive pattern of . . . f0, f1, f0, f2, f0, f1, . . . .

On the other hand, with the present recording/reproducing apparatus 10, the clock frequency of the RF signals (recording rate/head) is 41.85 Mbps which is not changed from that of the conventional DV system. In the first sub-track (SubTr#0) are recorded data of the odd track (Och) of the recording/reproducing apparatus of the conventional DV system, whereas, in the second sub-track (SubTr#1) are recorded data of the even track (Ech) of the recording/reproducing apparatus of the conventional DV system. Between the first sub-track (SubTr#0) and the second sub-track (SubTr#1), there is provided a period corresponding to 3° of the wrap angle, with the rotational angle from the start position of the data of the first sub-track (SubTr#0) to the start position of the data of the next first sub-track (SubTr#0) being 180°. The two magnetic heads 41, 42, arranged on the rotary drum 40, are alternately selected on switching by the switching pulse SWP, in terms of a channel made up of RF signals of the set of the sub-track (SubTr#0) and the sub-track (SubTr#1) as a unit.

That is, with the present recording/reproducing apparatus 10, the RF signals of the odd track (Och) and those of the even track (Ech) in the DV system are treated as a channel, so that the sole channel comprised of the RF signal set is recorded as a sole track each 180° rotation of the drum.

Also, the ATF pilot signals in the present recording/reproducing 10 are recorded in a repetitive pattern of . . . f0, f1, f0, f2, f0, f1, . . . on the respective tracks in each of which is arranged a sole channel comprised of the RF signal set. The track patterns are formed by head switching and real-location of the ATF pilot signals.

With the above-described recording/reproducing apparatus 10, data of the DV system can be recorded on a magnetic tape wider in tape width than the magnetic tape used in the DV system, such as the 8 mm tape. Since the two-track data of the DV system are recorded in succession on one track of an 8 mm tape in the same data pattern, the tape area can be used effectively to enable recording over longer time. Conversely, if the recording is to be made for the same time duration, a shorter tape length suffices in comparison with the case of recording DV track patterns one-by-one on the 8 mm tape, thus contributing to reduction in tape consumption.

Also, in the present recording/reproducing apparatus 10, since the signals of the DV format can be recorded on the 8 mm video tape by simply changing the drum rpm with respect to the mechanical deck of the pre-existing 8 mm tape recorder and by simply re-allocating the switching pulse of the DV signal system, the production equipments or components for conventional video tapes can be exploited more effectively.

Also, in the present recording/reproducing apparatus 10, provided with the extension area, audio data or video data can be post-recorded without overwriting the data recorded on the usual area. In particular, post-recording can be reliably effected by having a sufficient gap and the track synchronization information for data of the extended area. In the DV system, in which the sub-code is at back of a track, it is difficult to rewrite only the sub-code due to linearity. Conversely, in the present recording/reproducing apparatus 10, the sub-code of the extension area is in the vicinity of the area for extension and hence only the sub-code can be rewritten easily.

What is claimed is:

1. A magnetic recording apparatus comprising:

recording data generating means for generating recording data in meeting with a digital recording format applied to a first magnetic tape of a pre-set tape width;

extension data generating means for generating extension data for said recording data; and recording means for recording, on a second magnetic tape wider in tape width than said first magnetic tape, the recording data generated by said recording data generating means and the extension data generated by said extension data generating means;

said recording means successively recording, on a sole track formed on said second magnetic tape, the recording data of at least two tracks in the digital recording format generated by said recording data generating means and the extension data generated by said extension data generating means.

2. The magnetic recording apparatus according to claim 1 wherein said recording data generating means appends the same pilot signals for tracking to said recording data of at least two tracks in the digital recording format and said extension data generated by said extension data generating means, said recording data and the extension data being recorded in succession on a sole track of said second magnetic tape.

3. The magnetic recording apparatus according to claim 1 wherein said recording data generating means generates recording data conforming to the DV format;

said recording means successively recording, on a sole track formed on said second magnetic tape, having a tape width of 8 mm, the recording data of at least two tracks in said digital recording format generated by said recording data generating means and the extension data generated by said extension data generating means.

4. A magnetic recording method comprising:

generating recording data in meeting with a digital recording format applied to a first magnetic tape of a pre-set tape width;

generating extension data for said recording data; and recording, on a second magnetic tape wider in tape width than said first magnetic tape, the recording data of at least two tracks in the digital recording format and the extension data.

5. The magnetic recording method according to claim 4 wherein the same pilot signals for tracking are appended to the recording data of at least two tracks in the digital recording format recorded in succession on a sole track of the second magnetic tape and to the extension data.

6. The magnetic recording method according to claim 4 wherein data conforming to the DV format are generated and wherein the recording data of at least two tracks in said digital recording format and said extension data are recorded in succession on a sole track formed on said second magnetic tape having a tape width of 8 mm.

7. A magnetic reproducing apparatus for digital signals comprising:

reproducing means for reproducing recording data and extension data for said recording data from a second tape having recorded thereon said recording data and the extension data, said recording data conforming to a digital recording format applied for a first magnetic tape of a pre-set tape width, said second tape being wider in tape width than said first magnetic tape;

recording data processing means for processing the recording data reproduced by said reproducing means; and extension data processing means for processing the extension data generated by said reproducing means;

said reproducing means successively reproducing the recording data of at least two tracks in the digital recording format from a sole track formed on said second magnetic tape.

8. The magnetic reproducing apparatus according to claim 7 wherein said reproducing means detects pilot signals for tracking from the recording data of at least two tracks in the digital recording format recorded in succession on a sole track of the second magnetic tape and the extension data to control the tracking of each track.

9. The magnetic reproducing apparatus according to claim 7 wherein said reproducing means successively reproduces the recording data of at least two tracks in the digital recording format from a sole track formed on a second magnetic tape with a tape width of 8 mm;

said recording data processing means processing the recording data of at least two tracks in the DV format from a sole track formed on the second magnetic tape with a tape width of 8 mm.

10. A magnetic reproducing method wherein the recording data of at least two tracks in a digital recording format applied to the a magnetic tape of a pre-set tape width and extension data for said recording data are successively reproduced from a sole track formed on a second magnetic tape, said second magnetic tape having recorded thereon said recording data and the extension data, said second magnetic tape being wider in tape width than said pre-set tape width;

processing the reproduced recording data; and processing the reproduced extension data.

11. The magnetic reproducing method according to claim 10 wherein the pilot signals for tracking are detected from the recording data of at least two tracks in the digital recording format recorded in succession on a sole track of the second magnetic tape and the extension data to control the tracking of each track.

12. The magnetic reproducing method according to claim 10 wherein the recording data of at least two tracks in the DV format are successively reproduced from a sole track formed on the second magnetic tape having a tape width of 8 mm and wherein the recording data is processed in meeting with said DV format.

\* \* \* \* \*